United States Patent [19]

Nagaraj

[11] Patent Number: 5,708,703
[45] Date of Patent: Jan. 13, 1998

[54] WIDE RANGE EQUALIZER WITH LINE LENGTH DETECTION

[75] Inventor: Krishnaswamy Nagaraj, Sommerville, N.J.

[73] Assignee: Lucent Technologies Inc., Murray Hill, N.J.

[21] Appl. No.: 453,944

[22] Filed: May 30, 1995

Related U.S. Application Data

[63] Continuation-in-part of Ser. No. 159,151, Nov. 30, 1993, abandoned.

[51] Int. Cl.$^6$ ............................................. H04M 7/00
[52] U.S. Cl. ..................... 379/340; 379/347; 379/394; 379/400; 375/229; 333/18
[58] Field of Search ........................... 379/338, 340, 379/345, 346, 347, 377, 390, 394, 395, 398, 400; 375/229, 230, 232, 235; 333/17.3, 18, 28; 330/304

[56] References Cited

U.S. PATENT DOCUMENTS

| | | | |
|---|---|---|---|
| 4,378,535 | 3/1983 | Chiu et al. | 333/18 |
| 4,686,686 | 8/1987 | Nakayama et al. | 375/11 |
| 4,797,898 | 1/1989 | Martinez | 375/12 X |
| 4,887,278 | 12/1989 | Gupta | 379/394 X |
| 5,048,055 | 9/1991 | Creigh et al. | 333/18 |
| 5,388,123 | 2/1995 | Uesugi et al. | 333/18 |

*Primary Examiner*—Krista M. Zele
*Assistant Examiner*—Scott L. Weaver

[57] ABSTRACT

An automatic line equalizer for use with a T1 or an E1 repeater in a telecommunications system is disclosed. The equalizer includes a first equalizing means for equalizing an input line having a line length falling within a first range and a second equalizing means for equalizing an input line having a line length falling within a second range. The equalizer includes a line condition/length detector. The equalizer includes switch means for selectively coupling one of the first and second equalizers to the selected input line as a function of a line condition indication. The switching means prevents hunting between said first and said second equalizers.

7 Claims, 4 Drawing Sheets

WIDE RANGE EQUALIZER WITH LINE LENGTH DETECTION

CROSS REFERENCE TO RELATED APPLICATIONS

This application is a continuation-in-part of commonly owned, application Ser. No. 08/159,151 filed Nov. 30, 1993 now abandoned.

BACKGROUND OF THE INVENTION

1. Field of the Invention

The invention relates to repeaters used in digital telephone communications, and more particularly, to an automatic line length equalizer for use in a T1 or an E1 repeater.

2. Related Art

In telephony, T1 and E1 are digital transmission standards. T1 is a standard used in the United States. A similar standard used in Europe is identified as the E1 standard. An important component of a digital transmission system is the repeater. Repeaters are placed at regular intervals along a transmission line in order to regenerate signals. A digital baseband line equalizer is invariably employed in the front end of repeaters such as those used in a T1 or E1 system. The equalizer filters and amplifies a signal which has been distorted during transmission over a length of cable.

The signal is a ternary digital signal transmitted at a rate of 1.544 Mbits/sec (megabits per second) in the T1 standard, and 2.04 Mbits/sec in the E1 standard. By ternary, it is meant that the signal has three logic levels: low, zero and high. Data is encoded using an alternate mark inversion (AMI) scheme in which a logical zero is transmitted as a zero voltage, and a logical one is transmitted as either a high or low voltage.

System considerations require that the line equalizer automatically adjust its characteristics for different line lengths. For a T1 repeater, for example, the line loss varies from 0 db to 35 db at half the bit rate (because complementary data signals are used, the effective data rate is half the transmitted bit rate). The conventional line equalizer employs a variable RC network which is used to change the gain and frequency response of the equalizer to adapt to varying line conditions. However, the conventional scheme allows adaptation only over a limited range.

What is needed is an equalizer which can adapt to a wide range of varying line conditions.

SUMMARY OF THE INVENTION

The invention is a wide range digital baseband line equalizer. A line condition/length detector is used to switch the equalizer between coarse equalization settings. The equalizer then automatically adjusts to the specific line conditions. The line condition/length detector and the equalizer are fabricated on a single integrated circuit chip. The line condition/length detector includes a first electrical element (e.g., a MOSFET), a second electrical element (e.g., a MOSFET), an amplifier circuit, and a selector/control circuit. The first electrical element exhibits a fixed impedance (or conductance). The second electrical element exhibits a variable impedance (or conductance) which varies as a function of a gain control voltage of the line equalizer. The amplifier is configured to produce an output voltage as a function of a ratio between the impedance (conductance) of the first electrical element and the impedance (conductance) of the second electrical element. The selector/control circuit selects a line condition, and further, prevents the selection from causing oscillation between equalizers after a new equalizer has been switched into the circuit in response to a changed line length condition.

The variable element is controlled by a control voltage from an automatic gain control circuit. This same control voltage controls a variable impedance within the equalizer which is used to control the equalization (gain and frequency response characteristics) of the equalizer. Thus, the value of the control voltage is an indication of the equalization state of the equalizer which, by its adaptive nature, is a function of line condition/length.

The line length detector may further include a comparator bank for comparing the output voltage of the amplifier circuit to one or more reference voltages to produce a plurality of line condition/length indicating signals.

The wide range equalizer of the invention is responsive to the line condition/length indication. The line condition/length indication is used to switch or coarsely tune the equalizer to accommodate a wide range differing line lengths. Fine tuning of the equalization is performed in a known manner by adjusting a variable impedance RC network to change the equalization response of the equalizer.

In a first embodiment, the wide range equalizer includes a first equalizer having performance characteristics adapted for use with an input line having a length falling within a first range, a second equalizer having performance characteristics adapted for use with an input line having a length falling within a second range, and a switch for selectively coupling either the first equalizer or the second equalizer to the input line as a function of the line condition/length indication from the line condition/length detector.

In a second embodiment of the wide range line equalizer, a single equalizer is used. However, the equalizer includes a switch for changing the frequency response characteristics of the equalizer as a function of the line condition/length indication. For example, this may be implemented by switching a capacitor into one of the amplifier stages of the equalizer to produce a pole/zero pair in the frequency response.

The foregoing and other features and advantages of the invention will be apparent from the following more particular description of the preferred embodiments of the invention, as illustrated in the accompanying drawings.

DETAILED DESCRIPTION OF THE PREFERRED EMBODIMENT

The preferred embodiment of the invention is discussed with reference to the figures in which like reference numbers indicate like elements. Furthermore, the left most digit of each reference number indicates the number of the figure in which the number first appears. While specific part numbers and configurations are discussed, it should be understood that this is done for illustration purposes only. A person skilled in the art will recognize that other components and configurations may be used without departing from the spirit and scope of the invention.

Figure 1A:
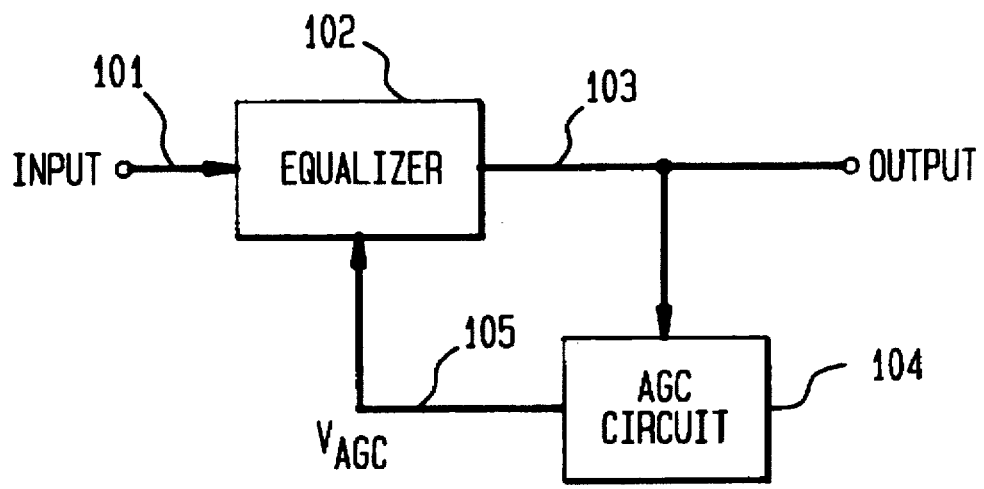
FIG. 1A is a block diagram illustrating an equalizer and automatic gain control (AGC) circuit.

FIG. 1A is a block diagram illustrating a typical digital baseband line equalizer such as that used in a T1 or E1 repeater. Equalizer 102 receives an input signal 101 and produces a ternary output signal 103. Input signal 101 is typically distorted by transmission over a relatively long telephone cable. Equalizer 102 equalizes the distorted signal to produce output signal 103. The term "equalize" means to amplify and filter.

Varying line conditions require different equalization. For example, longer line lengths have increased low pass filtering effects on a digital signal. Thus, when a signal is received from a long line length, the equalizer must perform a greater amplification at the high frequencies. At shorter line lengths, the extent of high frequency attenuation is reduced and therefore high frequency accentuation by the equalizer may be reduced. As discussed below, the equalizer of the invention adjusts its gain and frequency response (i.e., location of zeros and/or poles) to varying line conditions.

An automatic gain control (AGC) circuit 104 controls the equalization of equalizer 102. AGC circuit 104 monitors the amplitude of output signal 103 and produces a control voltage $V_{AGC}$ as a function of the amplitude of output signal 103. Control voltage $V_{AGC}$ is then applied to a control input 105 of equalizer 102.

Figure 1B:
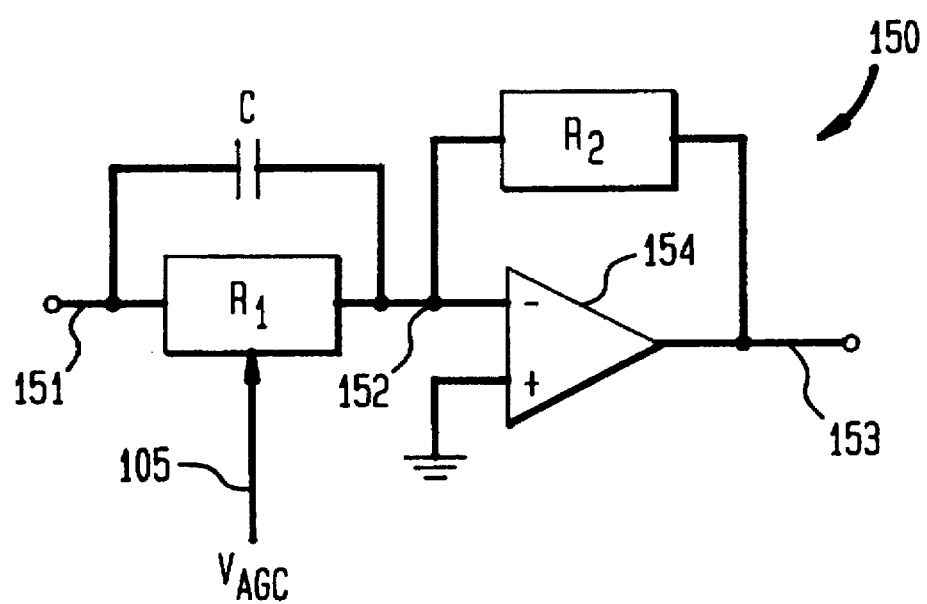
FIG. 1B is a block diagram illustrating a sample variable amplifier stage of an equalizer.

Equalizer 102 includes a plurality of amplifier stages. Control voltage $V_{AGC}$ is used to change the equalization (gain versus frequency characteristics) of one or more of the amplifier stages. This may be done in a number of ways which will be apparent to a person skilled in the relevant art. For illustration purposes, a single amplifier stage is discussed below. For example, FIG. 1B shows a sample inverting amplifier circuit 150. Amplifier circuit 150 includes an operation amplifier 154, an impedance element $R_1$, an impedance element $R_2$, and a capacitor C. Impedance element $R_1$ is connected between an input 151 and a summing junction 152 formed at an inverting input of amplifier 154. Capacitor C is connected in parallel with impedance element $R_1$. Impedance element $R_2$ is connected in a feedback configuration between summing junction 152 and an output 153 of amplifier circuit 150.

Impedance element $R_1$ is a variable element whose impedance/conductance is controlled by control voltage $V_{AGC}$ on control input 105. In the preferred embodiment, impedance element $R_1$ is implemented using a MOSFET. By changing the conductance of the MOSFET, both the DC gain and the location of a zero frequency ($1/R_1C$) are changed.

Operation of AGC circuit 104 in generating $V_{AGC}$ is described in further detail in commonly owned, copending U.S. patent application Ser. No. 08/159,402, filed May 30, 1995, entitled "Automatic Gain Control Circuit for a Digital Baseband Line Equalizer," now U.S. Pat. No. 5,377,231, which is incorporated herein by reference. Similarly, the manner in which $V_{AGC}$ is used to control the equalization of equalizer 102 is described in commonly owned, U.S. patent application Ser. No. 07/954,839, filed Sep. 30, 1992, entitled "Multiple Control Voltage Generation for MOSFET Resistors," now U.S. Pat. No. 5,412,263, which is also incorporated herein by reference.

Equalizer 102 can adapt its equalization only over a limited range by varying the value of impedance elements such as $R_1$ of amplifier circuit 150. Thus, an equalizer is normally designed for optimal performance over a limited range of line conditions. If, however, an indication of line condition (i.e., the amount of equalization required) can be accurately ascertained, then this information can be used to switch or coarsely tune an equalizer to a different range of performance specifications. Once switched to the new performance range, the equalizer can automatically adjust or finely tune itself to the precise line condition according to the method described with reference to FIG. 1B.

The primary factor influencing line condition is line length. Thus, the line condition is an approximation of line length. One way to determine line condition is to monitor the amplitude of the signal on input line 101. Unfortunately, the presence of noise on the input signal makes it difficult to make a correlation between line condition and signal amplitude. This is especially true at low signal levels. Another approach would be to monitor the control voltage $V_{AGC}$ which adjusts the equalization of equalizer 102. Control voltage $V_{AGC}$, however, can be an inaccurate indication of line condition because $V_{AGC}$ varies also as a function of the specific equalizer characteristics due to integrated circuit manufacturing variations and variations in component value due to changes in temperature.

While manufacturing process variations and temperature variations make $V_{AGC}$ an unreliable predictor of line condition when used directly, the inventor has discovered a means for gleaning an accurate line condition indication from control voltage $V_{AGC}$.

Figure 2A:
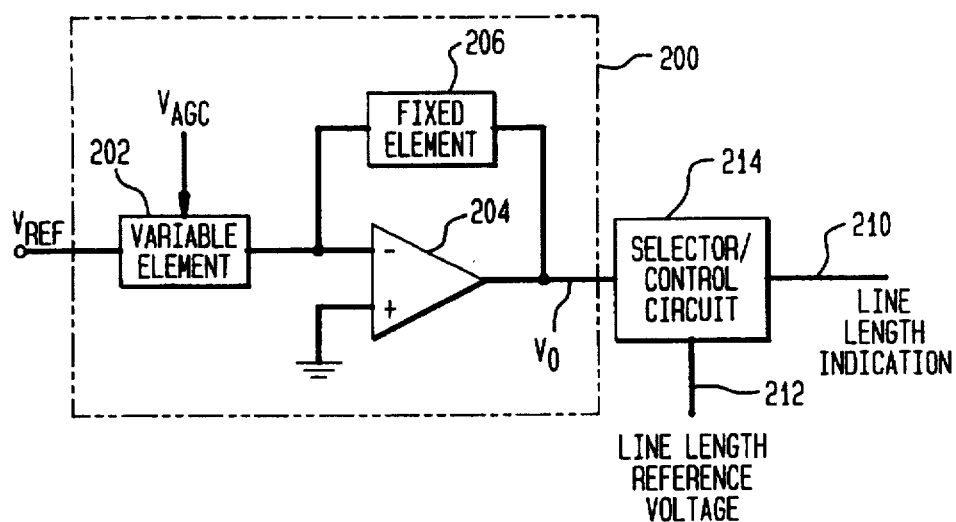
FIGS. 2A, 2B, and 2C illustrate a simplified schematic diagram of the line condition/length detection and oscillation control circuit of the invention.
Figure 2B:
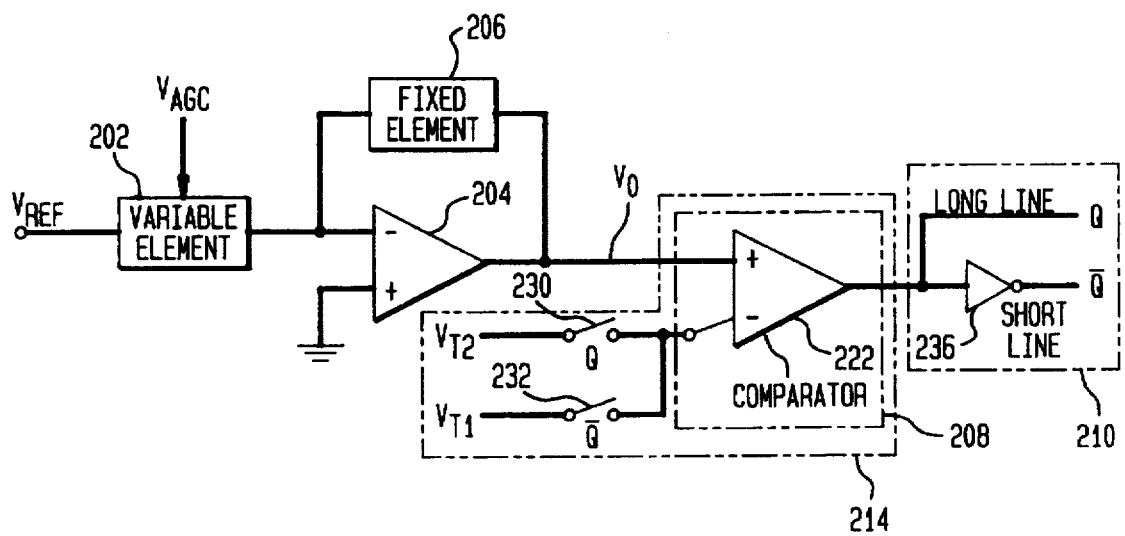
Figure 2C:
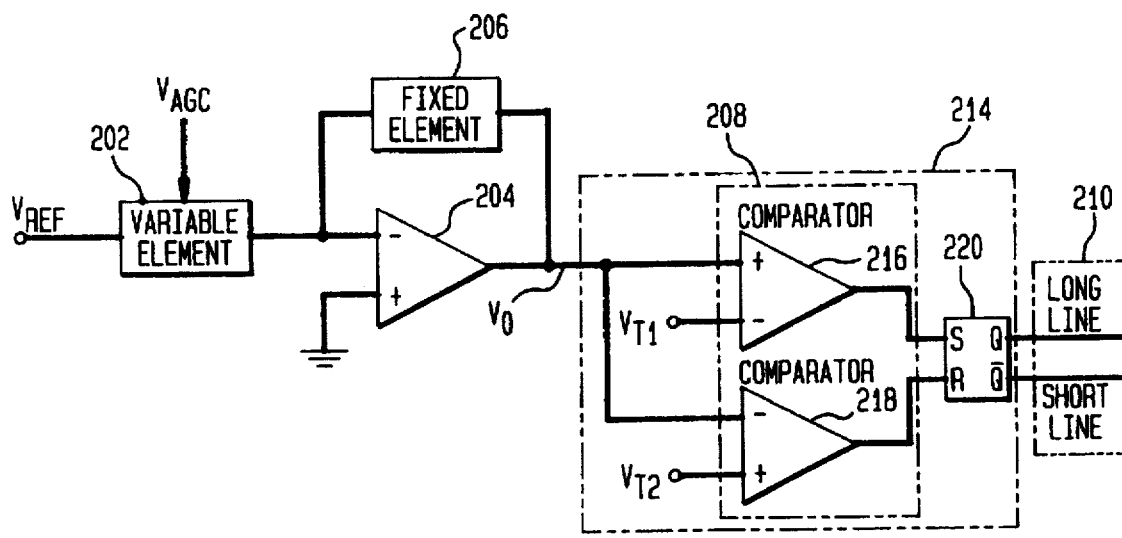

The line condition detector of the invention is shown in FIGS. 2A–2C. Line condition detector 200 includes an amplifier 204, a variable element 202, a fixed element 206, and a selector/control circuit 214. Amplifier 204 and elements 202,206 are arranged in an inverting amplifier configuration substantially similar to that of amplifier circuit 150 of FIG. 1B. A reference voltage $V_{REF}$ is connected to an inverting input of amplifier 204 through variable element 202. The non-inverting input of amplifier 204 is connected to ground. Fixed element 206 is connected to provide feedback from the output to the inverting input of amplifier 204. The output of amplifier 204 is input to selector/control circuit 214. One or more line condition reference voltages 212 are also input to selector/control circuit 214.

In the preferred embodiment, line condition detector circuit 200 is implemented on the same integrated circuit chip as equalizer 102 and AGC circuit 104. Variable element 202, fixed element 206, amplifier 204 and selector/control circuit 214 are implemented using standard integrated circuit fabrication techniques as would be apparent to a person skilled in the relevant art. For example, variable element 202 and fixed element 206 are implement using MOSFETs.

FIG. 2B illustrates a first preferred embodiment of the selector/control circuit 214 of the present invention in which the selector/control circuit 214 includes a comparator bank 208. As shown, in the preferred embodiment, comparator bank 208 includes a comparator 222. The positive terminal of the comparator 222 is electrically coupled to $V_O$. Two threshold voltages $V_{T1}$ and $V_{T2}$ are electrically coupled, through switches 230 and 232, to the negative terminal of the comparator. Switches 230 and 232 are controlled by control voltages Q and Q-bar respectively. The output of comparator 208 feeds two distinct paths. The output of comparator 208 is inverted in one path by inverter 236. The two distinct paths represent line condition indications 210. In an alternative preferred embodiment of the present invention (not shown), comparator bank 208 is implemented using a separate comparator 222 for each of one or more line length reference voltages 212 to be compared to the output of amplifier 204. Comparator bank 208 will compare $V_O$ to one or more line condition reference voltages 212 to produce one or more corresponding line condition indications 210. The line condition indication 210 is used to control the selector/control circuit 214 to prevent oscillation between selectable equalizers.

A second preferred embodiment of selector/control 214 circuit of the present invention is illustrated in FIG. 2C. In FIG. 2C, the output of amplifier 204 is electrically coupled to the positive input of comparator 216 and the negative input of comparator 218. As shown, comparator bank 208 includes comparators 216 and 218. The output of comparator 216 is electrically coupled to the S input of SR flip-flip 220. The output of comparator 218 is coupled to the R input of SR flip-flop 220. The Q and Q-bar outputs of SR flip-flop 220 are line condition indications 210.

Operation of line condition detector circuit 200 is now described with reference to FIGS. 2A–2C. An impedance $Z_{VAR}$ of variable element 202 is controlled by control voltage $V_{AGC}$ from AGC control circuit 104 (see FIG. 1A). An impedance $Z_{FIX}$ of fixed element 206 is substantially constant. The output voltage $V_{OUT}$ of amplifier 204 is defined by the following equation:

$$V_{out} = -V_{REF} \frac{Z_{FIX}}{Z_{VAR}}$$

$V_{REF}$ is a substantially constant reference voltage. Thus, $V_{OUT}$ will vary as a function of the impedance $Z_{VAR}$ of variable element 202 which, in turn, varies as a function of control voltage $V_{AGC}$. Thus, variable element 202 is controlled by the same control voltage that controls impedance elements such as $R_1$ within amplifier circuit 150 of equalizer 102 (see FIG. 1B). Impedance element $R_1$ controls the equalization of the equalizer. Thus, the value of control voltage $V_{AGC}$ is an indication of the equalization state of the equalizer which, by its adaptive nature, is a function of line condition.

With reference to FIG. 2A, the output voltage of the amplifier $V_O$ is input to the selector/control circuit 214. The selector/control circuit 214 serves to prevent "hunting" in the circuit as the line length indicator switches between equalizers. Hunting refers to undesirable oscillation between equalizers that would otherwise occur in the circuit if not prevented by the selector/control circuit 214.

Figure 3:
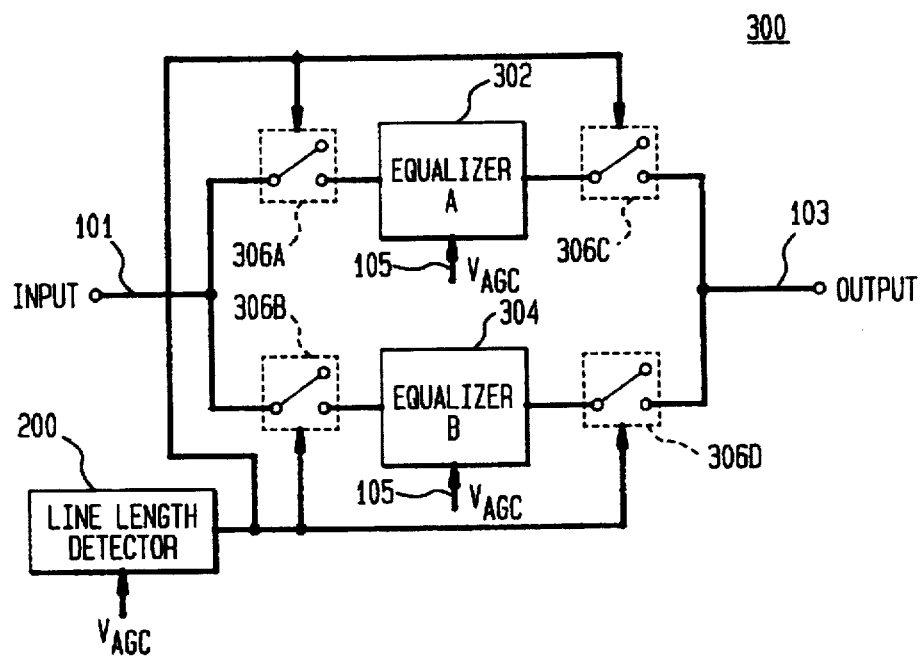
FIG. 3 is a block diagram illustrating a first embodiment of the wide range equalizer of the invention.

The "hunting" problem is described with reference to FIG. 2B and to FIG. 3. FIG. 3. illustrates a preferred embodiment of the present invention using two equalizers which are switched into the wide range equalizer 300 depending on a line condition indication 210. If the line length detector is initially set for a short line and a long line is connected to it, equalizer 102 will try to adapt to it. As a result, $V_O$ rises until it reaches the threshold for a long line length detection, $V_{T1}$. At this point, control voltage Q toggle from a low to a high, which causes equalizer 302, optimized for a long line, to be switched into the circuit. When long length equalizer 302 is switched into the circuit, $V_O$ will drop below $V_{T1}$. This would cause the short line equalizer 304 to be switched back into the circuit. Thus, unless prevented, the system may oscillate or "hunt" between the two equalizers. The selector/control circuit 214 prevents the oscillation effect.

The method of operation of the first preferred embodiment to control oscillation is described with reference to FIG. 2B. When the long line equalizer 302 is switched into the system, the comparator threshold is set to a lower threshold $V_{T2}$ because Q is asserted, thereby closing switch 230 and opening switch 232. This maintains control voltage Q at high, even when $V_O$ drops below $V_{T1}$. This is because the value of $V_{T2}$ is set lower than the voltage to which $V_O$ drops as a result of the switch to the long length equalizer 302.

In a second preferred embodiment, the value of control voltage Q is maintained by the use of an SR type flip-flop. Such a configuration is illustrated in FIG. 2C. Operation of this configuration is explained with reference to FIG. 2C. In FIG. 2C, $V_O$ is compared to $V_{T1}$ by comparator 216 and to $V_{T2}$ by comparator 218. If $V_O$ is greater than $V_{T1}$ then comparator 216 trips. This, in turn, causes the SR flip-flop 220 to be set. As a result Q is set to one. Due to the operation of the SR flip-flop, which is well known in the art, variations in $V_O$ do not cause the state of the flip-flop to change. This is because the state of the flip-flop does not change until the R input is asserted. If, on the other hand, $V_O$ is less than $V_{T2}$, comparator 218 trips. This, in turn, causes SR flip-flop 220 to be reset. As a result, Q-bar is set high. The flip-flop remains in this state until the S input is asserted. Small fluctuations in $V_O$ do not cause the flip-flop to change state. Thus, use of an SR flip-flop, as illustrated in FIG. 2C can also be used to eliminate the oscillation problem.

Figure 4:
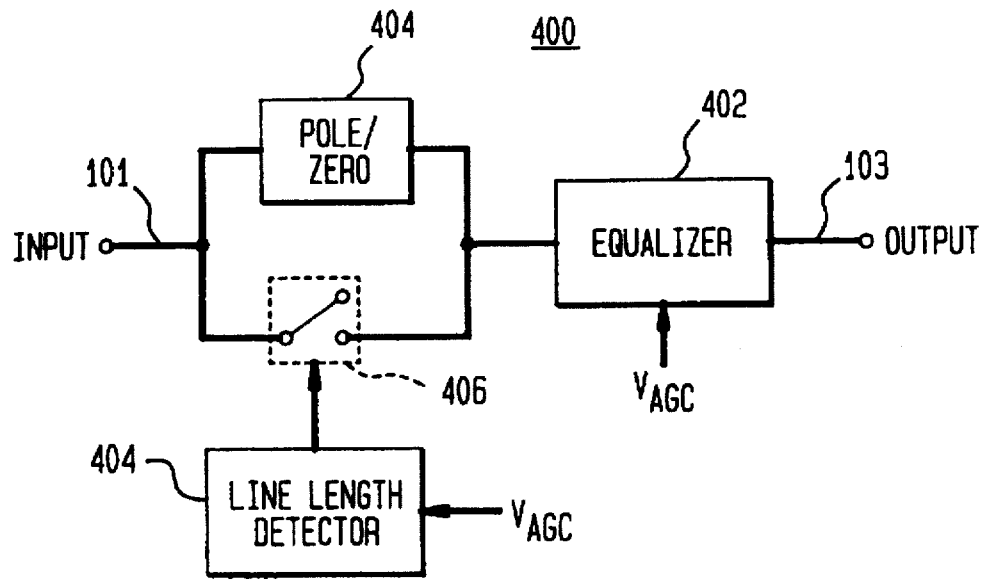
FIG. 4 is a block diagram illustrating a second embodiment of the wide range equalizer of the invention.
Figure 5:
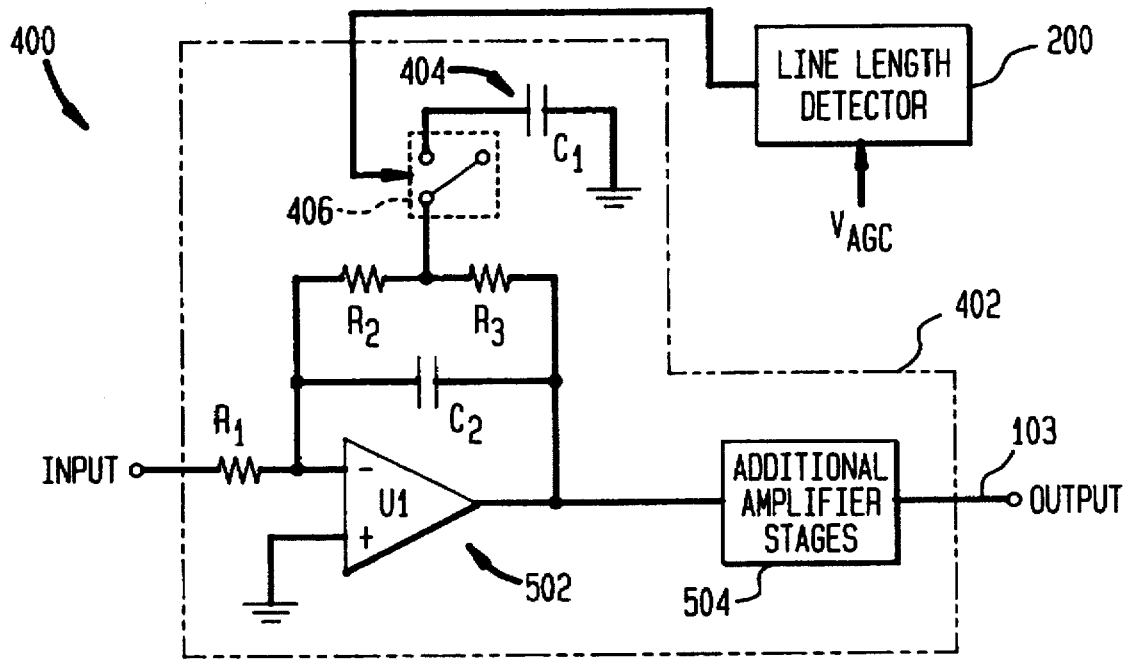
FIG. 5 is a schematic diagram illustrating implementation of the wide range equalizer of FIG. 4.

The line condition indication from line condition detector circuit 200 is used to implement the wide range equalizer of the invention, as illustrated in FIGS. 3–5. Referring first to FIG. 3, a first embodiment 300 of the wide range equalizer of the invention is shown. Wide range equalizer 300 includes a first equalizer 302, a second equalizer 304, and switches 306A–306D. Equalizers 302,304 are substantially identical to equalizer 102 of FIG. 1. Only one AGC circuit 104 is used for both of equalizers 302,304. In this embodiment, AGC circuit 104 will be connected to output line 103 and will feed a control voltage VAGC to the control inputs 105 of both equalizers.

Since line condition is primarily influenced by line length, equalizer 302 is configured with performance or equalization characteristics adapted for use with an input line having a length falling within a first range. Equalizer 304 is configured with performance characteristics adapted for use with an input line having a length falling within a second range. Switches 306A–306D connect the appropriate equalizer 302,304 between input line 101 and output line 103 as a function of a line condition indication from line condition detector circuit 200. For example, closing switches 306A and 306C while opening switches 306B and 306D will connect equalizer 302 between input line 101 and output line 103. Similarly, opening switches 306A and 306C and closing switches 306B and 306D will connect equalizer 304 between input line 101 and output line 103.

FIG. 4 illustrates a second embodiment 400 of the wide range equalizer of the invention. Equalizer circuit 400 includes an equalizer 402, a compensation circuit 404, and a switch 406. Switch 406 is controlled by line condition detector circuit 200. When switch 406 is opened in response to a line condition indication from line condition detector 200, compensation circuit 404 is connected in series with equalizer 402. Compensation circuit 404 alters the equalization range of equalizer 402 by, for example, adding a pole/zero pair. Closing switch 406 will remove the pole/zero pair from the equalizer circuit.

FIG. 5 illustrates the preferred implementation for equalizer 400. Equalizer 400 includes a plurality of amplifier stages. A first amplifier stage is illustrated at 502. Other amplifier stages are illustrated at 504. Amplifier stage 502 includes an amplifier U1, resistors $R_1$, $R_2$ and $R_3$, and a compensation capacitor $C_2$. Compensation circuit 404 is implemented by a single capacitor $C_1$. Capacitor $C_1$ is switched in for long input lines and switched out for short input lines. With the capacitor $C_1$ switched out, amplifier stage 502 has the following transfer function:

$$\frac{V_o(s)}{V_i(s)} = -\frac{1}{R_1 C_2} \cdot \frac{1}{S + \frac{1}{(R_2 + R_3) C_2}}$$

This is a low pass filter. By choosing $C_2$ appropriately, the transfer function can be made substantially flat in the frequency band of interest.

With $C_1$ switched into the circuit, the transfer function is modified as follows:
where $$\frac{V_o(s)}{V_i(s)} = -\frac{1}{R_1 C_2} \cdot \frac{S + \frac{1}{R_{23} C_1}}{S^2 + \frac{1}{R_{23} C_1} S + \frac{1}{R_2 R_3 C_1 C_2}}$$

$$R_{23} = R_2 \| R_3 = \frac{R_2 R_3}{R_2 R_3}$$

Note that the transfer function now includes a second order response with a zero. By selecting a suitable value for $C_1$, the zero can be positioned in the pass band of the amplifier to generate a boost in the frequency response. This will facilitate compensating for the high frequency attenuation from a longer input line. At the same time, the second order denominator term ensures that there is a rapid roll-off of the higher frequencies (out of the frequency band of interest). This helps to reject high frequency noise.

While the invention has been particularly shown and described with reference to several preferred embodiments thereof, it will be apparent to those skilled in the relevant art that various changes in form and details may be made therein without departing from the spirit and scope of the invention as defined in the appended claims.

What is claimed is:

1. An apparatus for equalizing an input signal input on a selected input line of a telecommunications system and producing an equalized output signal, comprising:

first equalizer means for equalizing the input signal, said first equalizer means having equalization characteristics configured for use with a first input line having a length falling within a first range;

second equalizer means for equalizing the input signal, said second equalizer means having equalization characteristics configured for use with a second input line having a length falling within a second range;

detector means for detecting and providing an indication of a line length of the selected input line; and switch means for selectively coupling one of said first equalizer and said second equalizer to the selected input line based on said indication from said detector means, and for adapting to a new line condition from said detector means upon switching between said first equalizer and said second equalizer to prevent hunting between said first and said second equalizers.

2. The apparatus of claim 1, further comprising:

automatic gain control means for monitoring the equalized output signal and producing a gain control signal, said gain control signal controlling said equalization characteristics of each of said first equalizer and said second equalizer.

3. The apparatus of claim 2, wherein said detector means comprises:

a first electrical element exhibiting a fixed impedance;

a second electrical element exhibiting a variable impedance, said variable impedance varying as a function of said gain control signal; and an amplifier circuit configured to produce said line condition indication as a function of a ratio between said fixed impedance of said first electrical element and said variable impedance of said second electrical element.

4. An apparatus for equalizing an input signal in a telecommunication system, comprising:

an equalizer connected to an input line, said equalizer including an amplifier means for amplifying the input signal to produce an equalized output signal;

detector means for detecting and indicating a line condition of said input line;

compensation means for altering an equalization range of the equalizer;

switch means, responsive to said indication from said detector means, for selectively enabling said compensation means based on said indication, and for altering said equalization range by selectively enabling said compensation means, wherein hunting between said equalization range and an altered equalization range is prevented; and automatic gain control means for monitoring the equalized output signal and producing a gain control signal, said gain control signal controlling amplification, by said amplifier means.

5. The apparatus of claim 4, wherein said detector means comprises:

a first electrical element exhibiting a fixed impedance;

a second electrical element exhibiting a variable impedance, said variable impedance varying as a function of said gain control signal; and an amplifier circuit configured to produce an output signal as a function of a ratio between said fixed impedance of said first electrical element and said variable impedance of said second electrical element, said output signal indicating said line condition.

6. The apparatus of claim 5, wherein said switch means comprises:

comparator means for comparing said output signal from said amplifier circuit of said detector means to a reference voltage, wherein said reference voltage is an indication of a line condition, and for selectively enabling said compensation means as a function of said comparison; and means for changing said reference voltage to adapt said switch means to said new line condition indication from said detector means upon the altering of said equalization range by said compensation means.

7. The apparatus of claim 5, wherein said switch means comprises:

comparator means for comparing said output signal from said amplifier circuit of said detector means to a reference voltage and for selectively enabling said compensation means as a function of said comparison; and latch means for latching said selective enablement of said compensation means to adapt the apparatus to said new line condition and a prevent hunting between said equalization range and said altered equalization range.

* * * * *